UNITED STATES PATENT OFFICE.

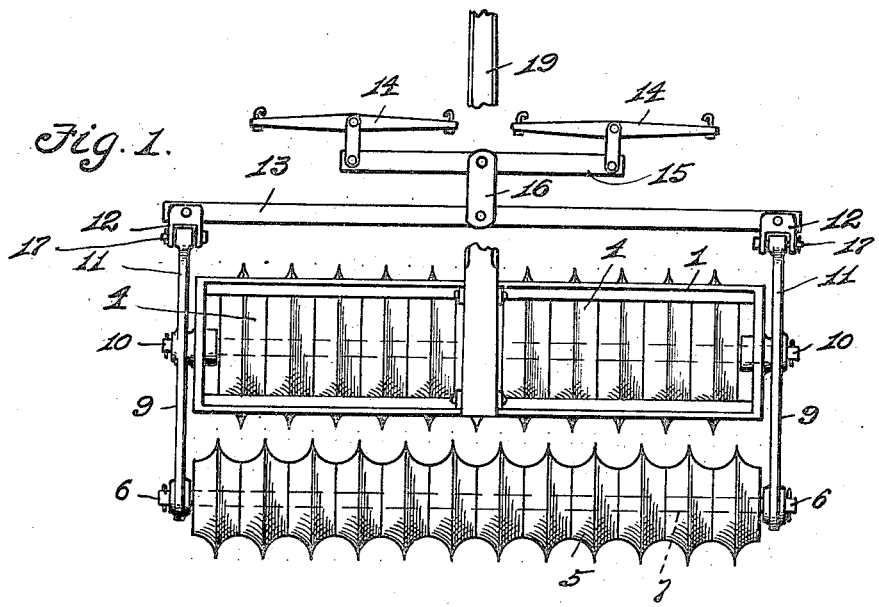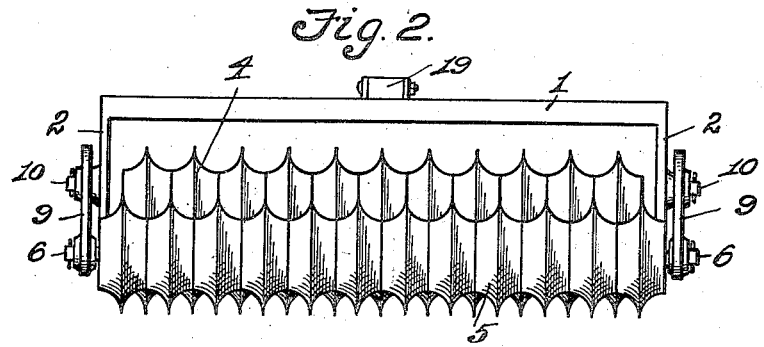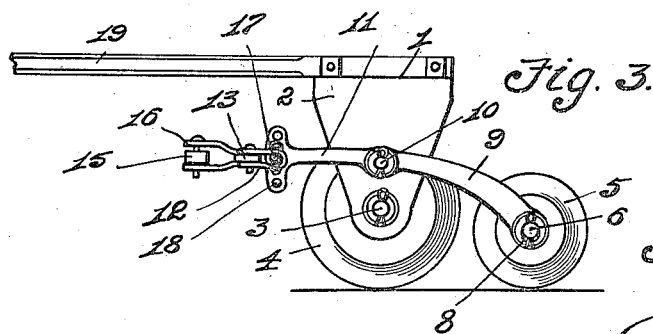

LYNN I. HOKE AND JOHN I. HOKE, OF SOUTH BEND, INDIANA.

PULVERIZER.

1,424,358.  Specification of Letters Patent.  Patented Aug. 1, 1922.

Application filed June 4, 1921. Serial No. 474,885.

*To all whom it may concern:*

Be it known that we, LYNN I. HOKE and JOHN I. HOKE, citizens of the United States, residing at South Bend, in the county of St. Joseph and State of Indiana, have invented certain new and useful Improvements in Pulverizers, of which the following is a specification.

The invention relates to pulverizers and rollers of a type wherein a plurality of gangs of discs arranged on shafts, one in advance of another, the rearwardly disposed gang of discs being loosely carried in the rear ends of forwardly extending pivoted arms carried by the main frame of the forwardly disposed discs, said arms extending forwardly of the forwardly disposed discs being provided with draft connections, whereby the draft animals may be utilized not only for moving the pulverizer as a whole but also for maintaining the rear discs in engagement with the ground with sufficient pressure for said discs to efficiently work the ground.

A further object is to provide a land roller or pulverizer comprising spaced rollers, one of said rollers being located forwardly of the other, and carried by a frame, the other roller being loosely mounted in pivoted arms, whereby it will accommodate itself to the undulations of the surface of the ground, and means whereby draft animals may be attached to the arms in such a manner that the rearwardly disposed roller will be forced downwardly by the draft of the animals.

A further object is to provide loose connections between the forward ends of the pivoted arms, whereby said arms which are loosely connected to the rearwardly disposed roller, may move independently of each other, thereby allowing the rearwardly disposed roller to adapt itself to the undulations of the surface of the ground.

A further object is to provide means whereby the front ends of the arms may be adjusted upwardly or downwardly in relation to the line of draft, thereby allowing the downward pressure of the rear roller to be varied in order to meet different soil conditions, for instance where the soil is hard.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the pulverizer.

Figure 2 is a rear elevation.

Figure 3 is a side elevation of the pulverizer.

Referring to the drawings, the numeral 1 designates an elongated frame, the opposite ends of which are provided with downwardly extending plates 2, in the lower ends of which is rotatably mounted the axle 3 of a pulverizing roller 4. The pulverizing roller 4 is formed from a plurality of discs held together in any suitable manner and mounted on the axle 3. Disposed rearwardly of the roller 4 is an auxiliary roller 5, which roller is formed from a plurality of discs similar to the discs of the roller 4, however they are preferably in staggered relation thereto, thereby forming a double pulverizing operation as the device as a whole moves forwardly. It has been found necessary to provide means whereby the roller 5 will be forced downwardly into engagement with the ground as the pulverizer moves forwardly. Heretofore, springs have been used for this purpose and also weights. In the present invention neither springs nor weights are relied upon to hold the roller 5 to its work, and the draft from the animals is utilized for holding the auxiliary roller 5 to its work. To accomplish this result the auxiliary roller 5 has the ends 6 of its shaft 7 loosely mounted in bearings 8 of forwardly extending arms 9, which arms are pivotally mounted on pins 10 of the downwardly extending plates 2, said arms 9 being pivoted intermediate their ends and have their forward portions 11 extending forwardly of the forward roller 4. It will be seen that by providing loose bearings 8 that the auxiliary roller 5 may tilt slightly in a transverse vertical plane thereby allowing the roller 5 to adapt itself to the undulations of the ground surface.

The forward ends of the arms 9 terminate in loose clevis connections 12 with a transversely disposed draft beam 13 and by means of which loose clevis connections the forward ends of the pivoted arms 9 may move independently of each other during the movement of the auxiliary roller 5 incident to the undulations of the ground surface, or as the roller passing over an obstruction, such for instance as a stone. By providing the clevis connections 12 it will be seen that the line of draft may be varied when animals are hitched to the singletrees 14, carried by the doubletree 15, which doubletree is connected through the medium of a link 16 to the cross bar 13, thereby allowing the amount of pressure exerted downwardly on the roller 5 to be varied according to the nature of the ground being worked.

The draft is varied by shifting the clevis pins downwardly or upwardly and passing the same through any of the apertures 18 in the forward ends of the arms 9. When the pins are shifted downwardly, it will be seen that the line of draft will be so shifted that increased pressure will be exerted downwardly on the roller 5 and when the pins 17 are shifted upwardly, it will be seen that the pressure will be reduced.

From the above it will be seen that a pulverizer and roller is provided which is so constructed that the use of springs or weights for holding down the rearwardly disposed roller is eliminated, and that the draft of the animals is utilized for forcing the rearwardly disposed rollers downwardly into engagement with the ground. Also that the downward pressure of the roller may be varied and that said roller may tilt as it moves over the ground.

The frame 1 is provided with a conventional form of tongue 19, to the forward end of which the animals may be hitched in the usual manner.

The invention having been set forth what is claimed as new and useful is:—

1. The combination with a land roller, of an auxiliary roller trailed thereby, said auxiliary roller being pivotally mounted to the rear ends of arms extending forwardly of the land roller, said forwardly extending arms being pivotally mounted to the land roller at points intermediate their lengths, and means whereby draft means may be connected to the forward ends of said arms and utilized for propelling the roller and exerting a downward pressure on the auxiliary roller.

2. The combination with a land roller comprising a frame having a roller mounted therein, of an auxiliary roller disposed behind the frame carried roller, said auxiliary roller being carried by rearwardly extending arms pivotally mounted on the roller frame, said rearwardly extending arms having forwardly extending portions terminating in clevises and means whereby draft means may be connected to said clevises and utilized for drawing the roller and simultaneously exerting a downward pressure on the auxiliary roller.

3. A land roller comprising a frame, a roller rotatably mounted in said frame, rockable members pivoted to said frame intermediate their lengths, an auxiliary roller disposed rearwardly of the frame carried roller and loosely mounted in bearings of the rear ends of the rockable members, and means whereby draft means may be connected to the forward ends of the rockable members and utilized for drawing the roller and simultaneously exerting a downward pressure on the auxiliary roller.

4. A land roller comprising a frame, a roller rotatably mounted in said frame, rockable members pivoted adjacent the ends of the frame, said rockable members being pivoted intermediate their ends, an auxiliary roller loosely mounted in the rear ends of the rockable members, the forward ends of said rockable members extending forwardly of the frame carried roller, means whereby draft means may be hitched to the forward ends of the rockable members, means whereby the forward ends of said rockable members may rock independently of each other, and means whereby the hitch may be varied for varying the downward pressure on the auxiliary roller.

5. The combination with a land roller, of an auxiliary roller carried thereby, said auxiliary roller being carried by pivotally mounted forwardly extending arms, means whereby said auxiliary roller may tilt vertically longitudinally, means whereby draft means may be hitched to the forward ends of said forwardly extending arms and utilized for drawing the roller and exerting a downward pressure on the auxiliary roller and means whereby the downward pressure on the auxiliary roller may be varied.

6. The combination with a land roller, of an auxiliary roller carried thereby, said auxiliary roller being loosely mounted in pivoted arms pivoted adjacent the main roller, and means whereby draft means may be connected to the pivoted arms and utilized for drawing the roller and for exerting a downward pressure on the auxiliary roller.

7. The combination with a land roller comprising a frame having a main roller therein, of an auxiliary roller disposed rearwardly of the main roller, said auxiliary roller being loosely mounted in the rear ends of rockable arms carried by the frame, said rockable arms being pivoted intermediate their ends and having their forward ends extending forwardly of the main roller, and means whereby draft means may be attached to the forward ends of the rockable arms in such a manner that said forward ends may move independently of each other.

In testimony whereof we affix our signatures.

LYNN I. HOKE.
JOHN I. HOKE.